Figure 1:
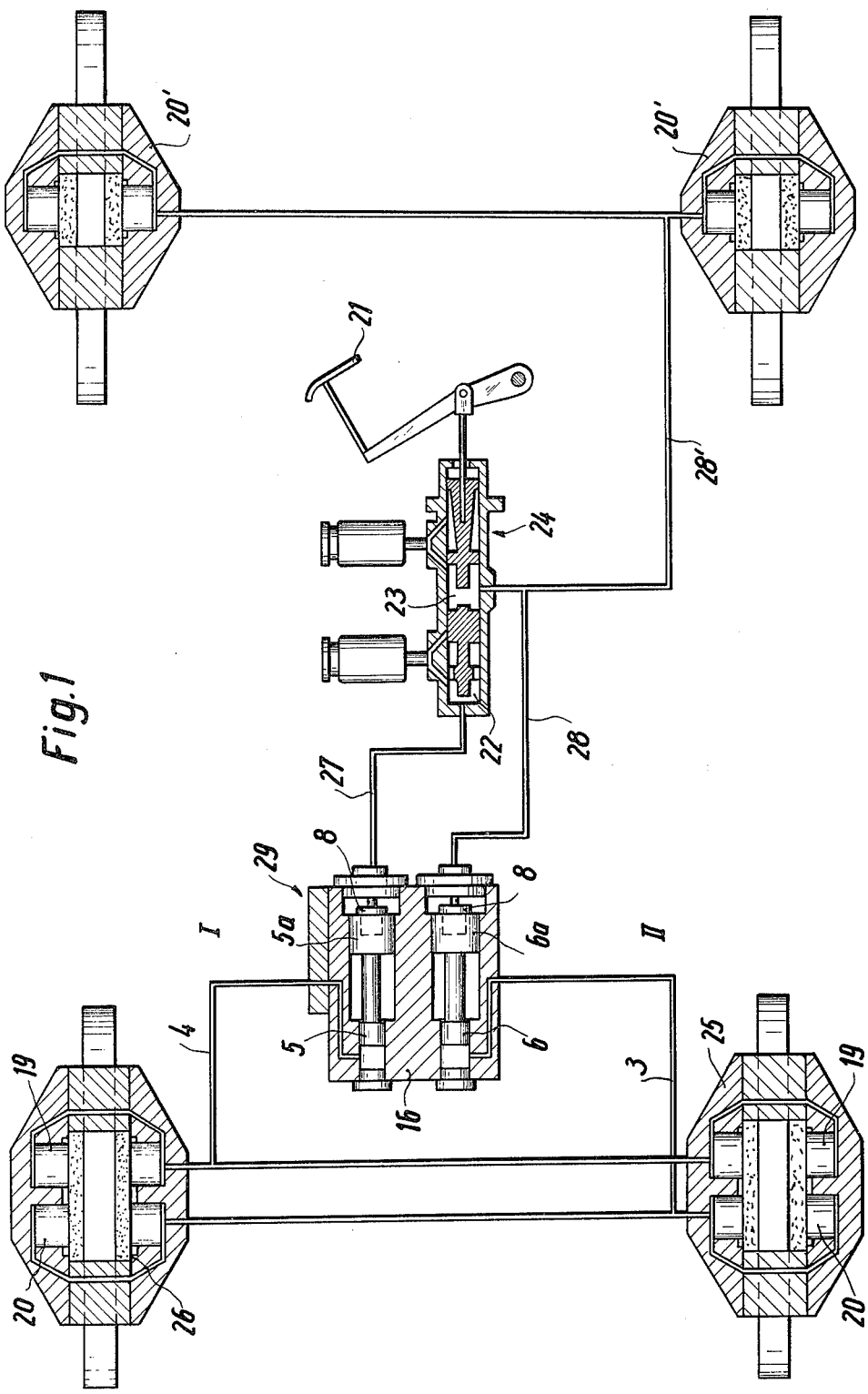

United States Patent [19]
Braun

[11] 3,883,189
[45] May 13, 1975

[54] SAFETY INSTALLATION FOR TWO CIRCUIT BRAKE SYSTEMS OF MOTOR VEHICLES
[75] Inventor: Erich Braun, Rielinghausen, Germany
[73] Assignee: Dr. Ing. h.c.F. Porsche Aktiengesellschaft, Germany
[22] Filed: Aug. 16, 1973
[21] Appl. No.: 389,030

[30] Foreign Application Priority Data
Aug. 16, 1972 Germany............................ 2240095

[52] U.S. Cl............ 303/84 R; 188/151 A; 188/345; 303/6 R
[51] Int. Cl............................................ B63t 11/20
[58] Field of Search................ 303/84 R, 84 A, 6 R; 188/151 A, 345; 60/563, 566, 580

[56] References Cited
UNITED STATES PATENTS
3,425,222   2/1969   Cooney et al.......................... 60/563
3,441,318   4/1969   Bueler.............................. 303/84 A Primary Examiner—George E. A. Halvosa
Assistant Examiner—Sherman D. Basinger
Attorney, Agent, or Firm—Craig & Antonelli

[57] ABSTRACT

A safety installation for a two circuit brake system of motor vehicles with two brake circuits, in which each brake circuit has its own line system and independent wheel brake cylinders; a differential piston interconnected in the main flow and constructed as pressure amplifier which forms a unit with a valve arranged on the inside thereof, is thereby coordinated to each brake circuit; the valve automatically closes and opens up the main flow as a function of pressure drop in one of the brake circuits while each pressure space of the differential pistons has a line connection to the main line.

12 Claims, 2 Drawing Figures 3,883,189

SAFETY INSTALLATION FOR TWO CIRCUIT BRAKE SYSTEMS OF MOTOR VEHICLES

The present invention relates to a safety installation for two-circuit brake systems of motor vehicles with two brake circuits, whereby each brake circuit includes its own line system and independent wheel brake cylinders.

The two brake circuits of two circuit-brake systems consists each of an independent line system with its own wheel brake cylinders which are adapted to be acted upon with pressure fluid by means of a brake pedal acting on a master brake cylinder constructed as tandem cylinder and provided with two separate pressure chambers. Each brake circuit supplies for itself a sufficient braking power in order to stop the vehicle in case the other brake circuit fails as a result of a defect in the line system or at a wheel brake cylinder.

Different types of constructions of safety valves are known in the art for two-circuit brakes installations which are connected into the line system and serve for turning off a line branch having an excessive pressure drop whereby in case of a defect in one line branch the failure of the entire brake circuit is prevented.

In one known type of construction of such a safety valve (German Pat. No. 839,349) a differential piston bypassed by a bypass line and acted upon on both sides with the line pressure is interconnected in each line branch, which differential piston under normal conditions is held in a position releasing the discharge aperture of the bypass line by way of the line pressure acting on its larger piston surface and an abutment. In case of a collapse of the line pressure downstream of the differential piston, the latter is displaced under the effect of the line pressure acting upon its smaller piston surface into the closing position closing the discharge aperture of the bypass line so that the corresponding line branch is closed off.

In contradistinction thereto, the present invention is concerned with the task to provide a safety installation for two-circuit brake systems of motor vehicles in which the manufacture of the safety installation is simplified and control fluid can be economized, and in which in case of a failure of a brake circuit no reduction of the braking power occurs.

The underlying problems are solved according to the present invention in that a differential piston constructed as pressure amplifier element and connected in the main flow, which forms a unit with a valve arranged on the inside thereof, is coordinated to each brake circuit and in that the valve automatically closes and opens up the main flow in dependence on the pressure drop in one of the brake circuits and each pressure space of the differential piston includes a line connection to the main line.

It is achieved in an advantageous manner by the construction according to the present invention that a structural part which can be easily installed and exchanged is adapted to be interconnected into the main flow of the brake circuit. According to a further feature of the present invention provision is made that the valve is coaxially arranged in the larger piston of the stepped piston in such a manner that it lies at the inlet of a through-flow bore extending through the differential piston along the longitudinal axis thereof. Furthermore, the valve is movably supported in the brake fluid stream and cooperates with a plunger that is fixedly arranged in a cap of the piston housing. Moreover, provision is made according to the present invention that the plunger is constructed dish-like with through-flow bores in the plate and its stem extends in the extended through-flow bore of the differential piston within the valve body, in the center of which is arranged spring-loaded valve ball cooperating with the stem. Additionally, provision is made according to the present invention that the differential piston abuts in the open position at an abutment of the piston housing and the valve ball is lifted out of its valve seat in the valve body by way of the plunger stem and in the closing position the valve ball is supported in the valve seat.

Figure 2:
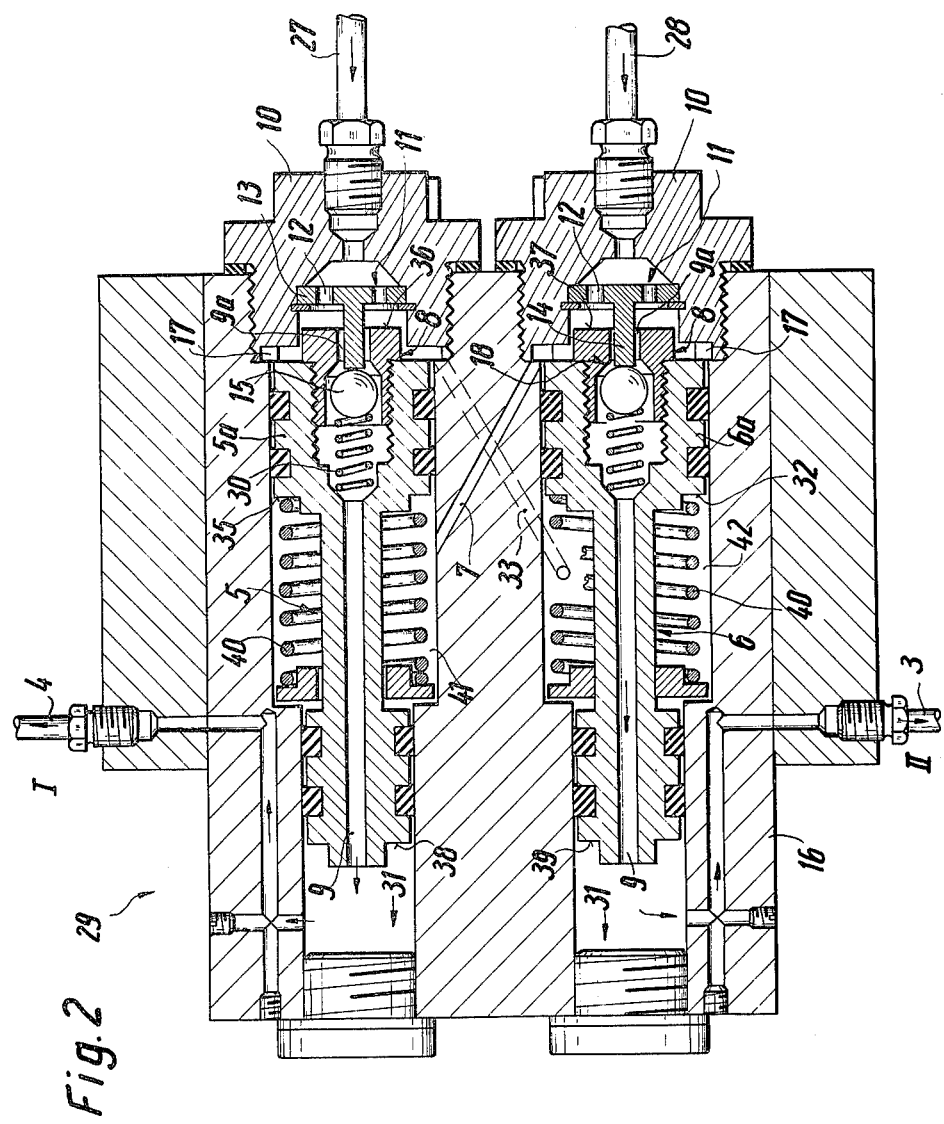

These and other objects, features and advantages of the present invention will become more apparent from the following description when taken in connection with the accompanying drawing which shows, for purposes of illustration only, one embodiment in accordance with the present invention, and wherein:

FIG. 1 is a schematic view of a two-circuit brake system equipped with a safety installation according to the present invention, and FIG. 2 is a horizontal cross-sectional view, on an enlarged scale, through the differential pistons with their valves according to the present invention.

Referring now to the drawing wherein like reference numerals are used throughout the two views to designate like parts, the brake installation includes two mutually independent line systems 3 and 4, forming together with wheel brake cylinders 19 and 20 one brake circuit each, which are supplied with pressure fluid by a master brake cylinder generally designated by reference numeral 24 which is actuatable by a brake pedal 21 and is constructed as tandem cylinder with two separate pressure chambers 22 and 23. The wheel brake cylinders 19 and 20 at the front axle are arranged mutually independently in the brake saddle or caliper 25 of the disc brake pairwise on both sides of the brake disc and actuate a common brake lining carrier 26. A safety installation generally designated by reference numeral 29 which is arranged downstream of the master cylinder 24 and is connected with the pressure chambers 22 and 23 thereof by way of main lines 27 and 28, is interconnected in the brake system. A line 28' branches off from the line 28 between the master brake cylinder 24 and the safety installation 29 which leads to the wheel brake cylinders 20' of the rear axle.

The safety installation 29 includes for each brake circuit I and II a differential piston constructed as pressure amplifier and generally designated by reference numerals 5 and 6, respectively, which accommodate in their larger piston portions 5a and 6a one valve each generally designated by reference numeral 8. The differential piston 6 disposed in the brake circuit II is connected by way of the line 7 (FIG. 2) with the pressure space 41 of the piston 5, and the differential piston 5 disposed in the brake circuit I is connected by way of the line 33 with the pressure space 42 of the piston 6.

The valve 8 is seated, as viewed in the flow direction of the main stream, at the beginning of a longitudinal bore 9 for the main stream, which extends through the differential pistons 5 and 6. The valve 8 is constructed as ball valve and the valve ball 15 spring-loaded by way of a spring 30 and is operatively connected with a plunger generally designated by reference numeral 11.

The plunger 11 is rigidly connected with a cap 10 of the piston housing 16 and includes in its plate 13 throughflow bores 12 for the main stream whereby its stem 14 extends into the throughflow bore 9a disposed within the valve 8 and extending beyond the differential pistons 5 and 6.

During normal pressure in both brake circuits I and II each of the differential piston 5 and 6 abuts against a stop 17 of the piston housing 16 and the valve 8 opens up the throughflow bore 9 for the main stream by way of the lines 3 and 4 to the wheel brake cylinders 19 and 20. The valve ball 15 is lifted out of its valve seat 18 and is pressed against the spring 30 by way of the plunger stem 14.

In case of a pressure drop in one of the brake circuits I or II, the respective piston is displaced in the direction 31 and the valve 8 closes the throughflow bore 9 for the main stream of the respective brake circuit. The valve ball 15 is seated in its seat 18 and is held therein by the pressure of the spring 30.

The operation of the safety installation is as follows: The pressure medium flows from the pressure chambers 22 and 23 (FIG. 1) of the master brake cylinder 24 by way of the main lines 27 and 28 to the differential pistons 5 and 6. The pressure medium is conducted by way of the bores 12 and the plunger 11, the bores 9a and the ball valves 8 through the throughflow bores 9 to the wheel brake cylinders 19 and 20 by way of the lines 3 and 4. The annular surface 32 of the differential piston 6 is acted upon by the pressure medium of the chamber 22 by way of the main line 27 and the line 33. The annular surface 35 of the piston 5 is acted upon by the pressure medium of the chamber 23 by way of the main line 28 and the line 7. In the opened normal position the differential pistons 5 and 6 abut against the end abutment 17.

During the actuation of the brake pedal 21 the differential pistons 5 and 6 are in equilibrium by the pressure in the same brake circuit on the large piston areas 36 and 37 and on the small piston areas 38 and 39 and by the pressure of the other brake circuit on the annular area 32 and 35 of the differential pistons. If the brake circuit I fails, then no pressure exists at the annular surface 32 of the piston 6 due to its connection by way of line 33. The differential piston 6 is displaced by the differential force between its larger and smaller piston surfaces 37 and 39 away from its abutment 17 in the direction 31. The ball valve 8 closes and the hydraulic transmission becomes fully effective, i.e., control piston 6 is displaced against the force of the spring 40, the main flow connection between the line branch 28 and 3 is interrupted and the now prevailing higher pressure is supplied by way of the lines 3 to the brake circuit II for the wheel brake cylinders 20. The prestress of the spring 40 is so large that the system does not respond at differential pressures smaller than 8 atu. Due to the considerably higher pressure with which the brake lining carriers 26 are now pressed against the brake disc, the loss in effective brake power of the wheel brake cylinders 19 is compensated for.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What I claim is:

1. A safety installation for two-circuit brake systems of motor vehicles with master cylinder brake means and two brake circuit means, each brake circuit means including and independent line system with a main line and independent wheel brake cylinder means, the installation comprising: housing means, pressure space means provided in said housing means for each brake circuit means, line means for communicating each of said pressure space means with the master cylinder brake means, differential piston means constructed as a pressure amplifier disposed in each of said pressure space means and coordinated to each brake circuit means, a throughflow bore extending through a respective differential piston means substantially coaxially with its longitudinal axis, a valve means disposed at one end of the throughflow bore of each differential piston means, the valve means being operable to automatically close or open the respective throughflow bores in dependence on a pressure drop in one of the brake circuit means, and line means for communicating the upstream side of each of the valve means in a pressure space means with the other pressure space means on the downstream side of the valve means disposed in the other pressure space means.

2. A safety installation according to claim 1, wherein each of said valve means is arranged coaxially in the larger piston portion of the differential piston means in such a manner that it is disposed at the inlet of a respective throughflow bore.

3. A safety installation according to claim 2, wherein a plunger means is provided fixedly arranged within each pressure space means, and wherein the valve means is movably supported in a brake fluid stream and cooperates with said plunger means.

4. A safety installation according to claim 3, wherein a cap member is provided on said housing means, and said plunger means is fixedly arranged at said cap member.

5. A safety installation according to claim 3, wherein said plunger means is constructed plate-like and is provided with throughflow bores in its plate portion, said plunger means includes a stem extending through said throughflow bore of said differential piston means within the valve means, and wherein said valve means includes a valve body, a valve seat and a spring-loaded valve ball arranged substantially centrally of said valve body, said spring-loaded valve ball cooperating with the stem of the plunger means to open and close said throughflow bore of said differential piston means.

6. A safety installation according to claim 5, wherein said housing means is a common piston housing.

7. A safety installation according to claim 6, wherein the piston housing is provided with abutment means coordinated to each differential piston means, said differential piston means abuts in the open position at a respective abutment of the piston housing and each of the respective valve balls is lifted out of its valve seat in said valve body by way of the plunger stem, the respective valve balls being supported in its respective valve seat in the closed position.

8. A safety installation according to claim 1, wherein a plunger means is provided fixedly arranged within each pressure space means, and wherein the valve means is movably supported in a brake fluid stream and cooperates with said plunger means.

9. A safety installation according to claim 8, wherein a cap member is provided on said housing means, and said plunger means is fixedly arranged at said cap member.

10. A safety installation according to claim 8, wherein said plunger means is constructed plate-like and is provided with throughflow bores in its plate portion, said plunger means includes a stem extending through said throughflow bore of said differential piston means within the valve means, and wherein said valve means includes a valve body, valve seat and a spring-loaded valve ball arranged substantially centrally of said valve body, said spring-loaded valve ball cooperating with the stem of the plunger means to open and close said throughflow bore of said differential piston means.

11. A safety installation according to claim 10, wherein the piston housing is provided with an abutment means coordinated to each differential piston means, said differential piston means abuts in the open position at a respective abutment means of the piston housing and each of the respective valve balls is lifted out of its valve seat in said valve body by way of the plunger stem, the respective valve ball being supported in its valve seat in the closed position.

12. A safety installation according to claim 1, wherein said housing means is a common piston housing.

* * * * *